United States Patent [19]

Lawson et al.

[11] 4,221,128

[45] Sep. 9, 1980

[54] ACOUSTIC CURRENT METER

[75] Inventors: Kenneth D. Lawson, Cataumdet; Neil L. Brown, Falmouth, both of Mass.

[73] Assignee: Neil Brown Instruments Systems, Inc., Falmouth, Mass.

[21] Appl. No.: 947,253

[22] Filed: Sep. 29, 1978

[51] Int. Cl.$^3$ ............................................. G01F 1/66
[52] U.S. Cl. .............................. 73/861.29; 73/170 A
[58] Field of Search ..................... 73/170 A, 592, 597, 73/194 A

[56] References Cited

U.S. PATENT DOCUMENTS

| | | | |
|---|---|---|---|
| 3,653,259 | 4/1972 | McShane | 73/194 A |
| 3,861,211 | 1/1975 | Dewan | 73/194 A |
| 3,935,735 | 2/1976 | Lee | 73/194 A |
| 4,011,755 | 3/1977 | Pedersen et al. | 73/194 A |
| 4,098,117 | 7/1978 | Baumoel | 73/194 A |

OTHER PUBLICATIONS

Gytre, T., Ultrasonic Current Meter, Jan. 1975.
Gytre, T., The Travel Time Difference Current Meter, date unknown.
Gytre, T., Operating Experiences with an Ultrasonic Current Meter, 1974.
Lawson, Jr., K. D. et al., A Three-Axis Acoustic Current Meter for Small Scale Turbulence, 1976.
Rester, G. F. et al., An Acoustic Oceanographic Current Meter, Sep. 1970.
Fowlis, W. W. et al., A Laser-Doppler Velocimeter with Ocean Applications, date unknown.
Stichman, J. H., A Sonic Velometer, Transactions on Instrumentation and Measurement, vol. 23, No. 3, Sep. 1974.
Kaimal, J. C. et al., An Improved Three-Component Sonic Anemometer for Investigation of Atmospheric Turbulence, May 1971.
Bovsheverov, V. M. et al., A Three-Component Acoustic Anemometer, 1972.
Beran, D. W. et al., An Acoustic Doppler Wind Measuring System, Journal of Acoustic Soc. of America, vol. 55, No. 2, Feb. 1974, pp. 334–338.
Kaimal, J. C. et al., A Continuous Wave Sonic Anemometer-Thermometer, Journal of Applied Meteorology, vol. 2, pp. 156–164, 1962.

*Primary Examiner*—Jerry W. Myracle
*Attorney, Agent, or Firm*—Sewall P. Bronstein; William H. Lee

[57] ABSTRACT

An acoustic current meter in which two channels have acoustic paths oriented at right angles to each other to measure orthogonal components of a current velocity. Each channel includes two transducers aimed at an acoustic mirror so that the reflected acoustic signal from each transducer impinges upon the opposite transducer. Periodically, a burst of high frequency acoustic energy is simultaneous emitted by each transducer. A current flowing produces a relative phase shift between the received signals representative of the current velocity. The output signal produced by each of the transducers is mixed with a common reference signal to provide two, low frequency, beat frequency signals having a phase difference proportional to the current velocity. Due to the reduction in frequency, the phase shift is expanded in time with respect to the phase shift of the acoustic signals and may be easily measured.

39 Claims, 12 Drawing Figures

FIG. 7
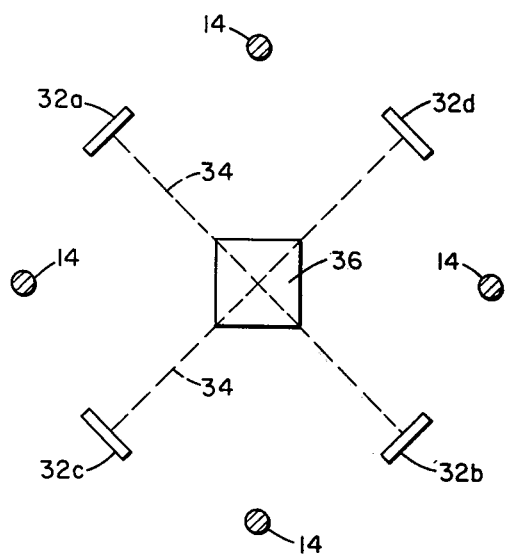
FIG. 8a
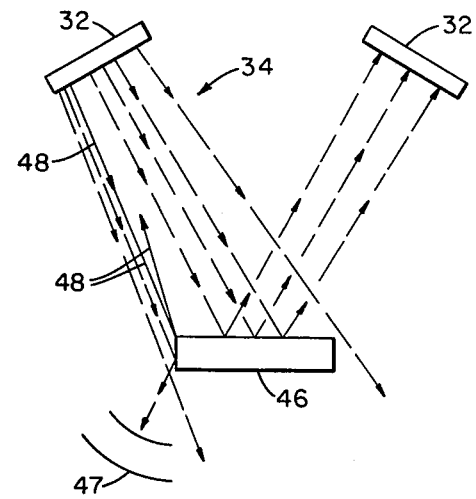
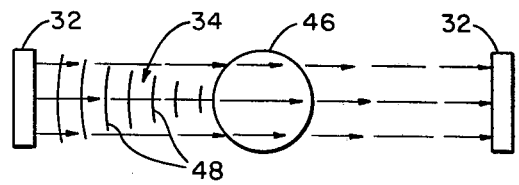
FIG. 8b
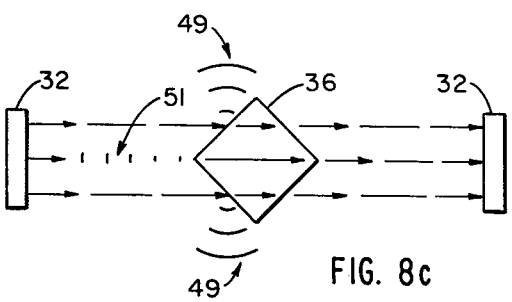
FIG. 8c
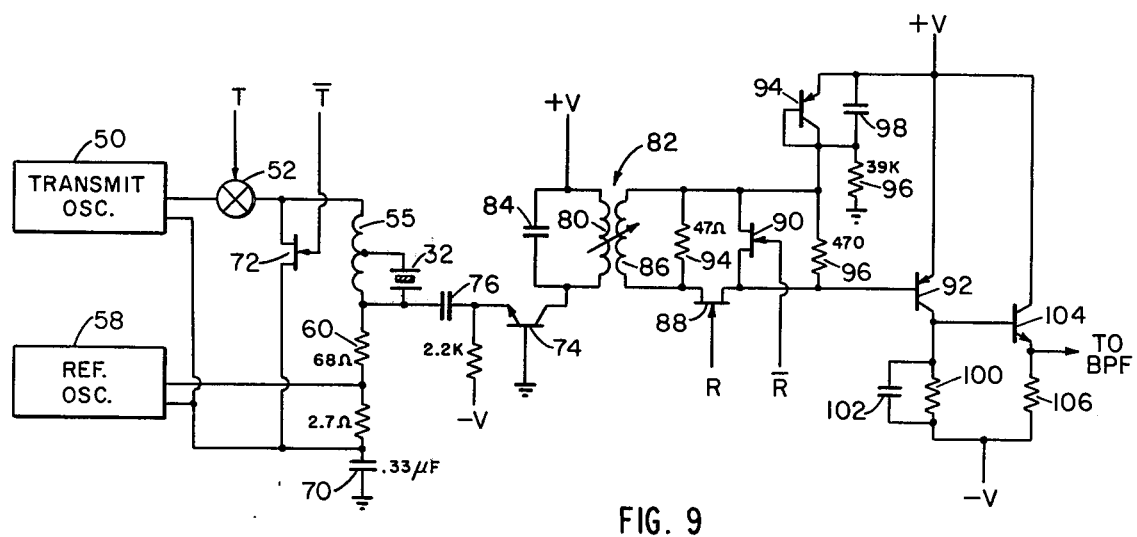
FIG. 9

ACOUSTIC CURRENT METER

The U.S. government has certain rights in this invention under contract no. N-0014-75-C-0113, awarded and administered by the Office of Naval Research.

FIELD OF THE INVENTION

The present invention is related to instruments for measuring the velocity of a moving liquid and more particularly to acoustic current meters for measuring ocean current velocities.

BACKGROUND OF THE INVENTION

Until recently, the measurement of ocean currents and other liquid velocity measurements have been performed using mechanical meters equipped with Savonious rotors and vane followers. These methods of measuring currents have significant problems, including poor reliability due to the direct exposure of mechanical moving parts to the marine environment resulting in corrosion and fouling by extraneous matter, and the non-ideal hydrodynamic properties of these mechanisms which result in inaccurate measurements. Various attempts have been made in the past to design better instruments. These designs have utilized acoustic, electromagnetic, and various other electronic sensing techniques which have eliminated some of the problems associated with mechanical current measuring devices. However, these recent systems have significant problems with their use including zero drift, high power consumption, inoperability in clear water (for acoustic backscatter current meters), and low sensitivity.

Acoustic current meters have been implemented in a number of different ways, including: (1) direct measurement of the propagation time of a pulse emitted by a first transducer and received by a second transducer; (2) dual "sing-around" sound velocimeters with straight line sound paths in opposite directions, the difference in "sing-around" frequency being a linear function of the current; (3) continuous wave systems using two widely different high frequency carriers (e.g., 1.1 and 1.6 MHz) but modulated with an identical signal of lower frequency (e.g. 20 kHz) where the phase difference of the modulating signal on the received carriers is a linear function of current velocity; and (4) continuous wave bursts using a single frequency on a single pair of transducers, the burst interval being approximately equal to the acoustic travel time between the two transducers.

SUMMARY OF THE INVENTION

The present invention uses a continuous wave burst technique which has advantages over previous methods of measuring current velocity. The acoustic current meter includes two identical channels having acoustic paths oriented at right angles to each other to measure orthogonal components of a current velocity. Each channel includes two piezoelectric or other type transducers aimed at an acoustic mirror in such a way that the reflected acoustic signal from each transducer impinges upon the opposite transducer. Periodically, a burst of high frequency acoustic energy is simultaneous emitted by each transducer. The burst length is shorter than the acoustic travel time, and each transducer receives the acoustic waves from the opposite transducer after it has finished transmitting acoustic waves. If a current is flowing through the acoustic path having a component parallel to the axis between the transducers, the acoustic signals going in opposite directions will be respectively advanced and delayed in time by the current to produce a relative phase shift between the received signals. The phase shift is representative of the current velocity.

The output signals produced by each of the transducers is combined with a common reference signal having a frequency very close to the transmitted frequency. For each transducer, the reference and received signals are then combined in a non-linear device which generates product terms, such as a multiplier or a square law detector. The difference or beat frequency components in the output of each multiplier is selected by an appropriate filter to provide two beat frequency signals having a phase difference proportional to the current velocity. Due to the reduction in frequency, the phase shift is expanded in time with respect to the phase shift of the transmitted signals and may be easily measured by means of conventional, low-power circuitry.

DESCRIPTION OF THE DRAWINGS

The advantages and operation of the present invention will become more clear upon reading the following description of the preferred embodiment in conjunction with the accompanying drawings, of which:

FIG. 7 shows the orientation of two current measuring channels;

FIG. 8a, 8b, and 8c illustrate the advantages of a new acoustic mirror design; and FIG. 9 is a detailed circuit diagram of one embodiment of FIG. 4.

DETAILED DESCRIPTION OF THE PREFERRED EMBODIMENT

Figure 1:
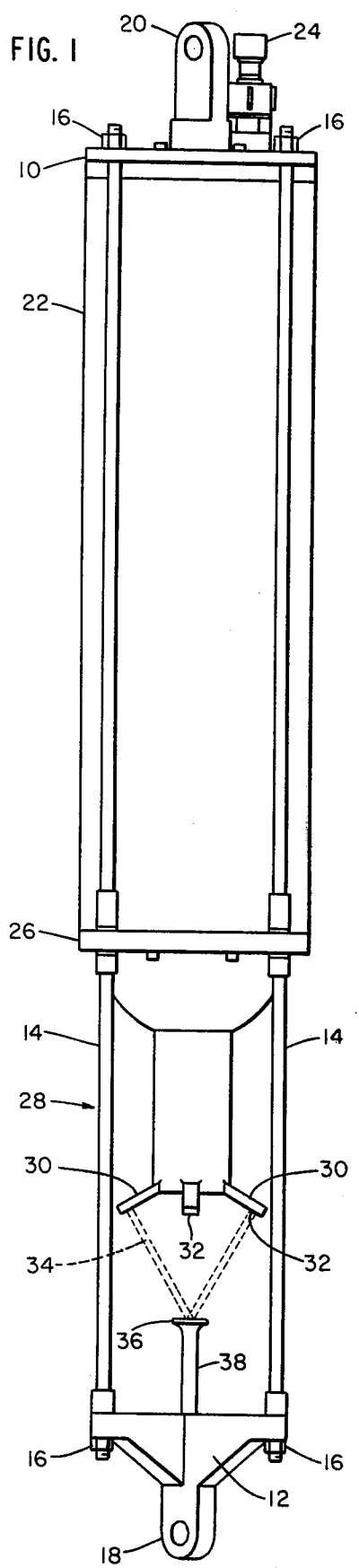
FIG. 1 shows the mechanical arrangement of the acoustic current meter of the present invention.

Referring to FIG. 1, there is shown a drawing of the acoustic current meter (ACM) as it would be deployed in an ocean or other body of water where currents are to be measured. The various subassemblies of the current meter are positioned between a top plate 10 and an X-shaped lower support section 12 which are maintained in a fixed relationship by means of four titanium rods 14 (only two of which are shown in FIG. 1.) Rods 14 pass through holes in top plate 10 and bottom part 12 and are fastened by means of bolts 16 or other suitable fasteners. The lower support 12 has a mooring ring 18 formed therein, and a second mooring ring 20 extends from top plate 10.

Beneath top plate 10 is a hollow cylindrical housing 22 which contains the electronics of the acoustic current meter, a fluxgate magnetometer, and a battery for powering the current meter. An electrical connector 24 is located on top plate 10 to allow calibration of the current meter electronics and for readout of data from the current meter. The bottom of the cylindrical body section 22 is formed of an aluminum plate 26 through which the four rods 14 pass.

Extending below body section 22 is a probe assembly 28 which is of a smaller cross-section than the body section 22 to reduce turbulence in the area where current measurements are to be taken. Extending outwardly and downwardly at an angle from transducer support 28 are four transducer probes 30 which are orthogonally aligned. Within each probe 24 is a transducer 32 which transmits and receives acoustic signals having a frequency of approximately 1.6 MHz. Transducers 32 are made of a piezoelectric material in the preferred embodiment described, but may also be electrostrictive, magnetostrictive, electrodynamic, or other type of transducer. These transducers 32 are oriented so as to transmit and receive acoustic waves along the paths shown by dotted lines 34. The acoustic waves are reflected off an acoustic mirror 36 which is positioned by a mirror support rod 38 extending upwardly from lower support section 12. Acoustic signals travel between transducers 32 located on opposed pairs of probes 30 so that the acoustic waves from opposed pairs of transducers travel along two V-shaped paths which are at 90 degrees to one another.

When the current meter shown in FIG. 1 is moored, currents which are present in the water cause the water to flow through the volume traversed by acoustic paths 34. As described below, this flow results in a differential propagation time and a corresponding phase shift in the acoustic signals transmitted between opposing pairs of transducers 32. By measuring such phase shifts, the two pairs of transducers measure the components of the current along two orthogonal axes. Signals representative of these components and signals from the fluxgate magnetometer within current meter body 22 are processed by electronics, also located within body 22, to provide signals representative of the north-south and east-west components of the ocean currents. This data may be immediately used or may be stored for later retrieval and analysis.

Figure 2:
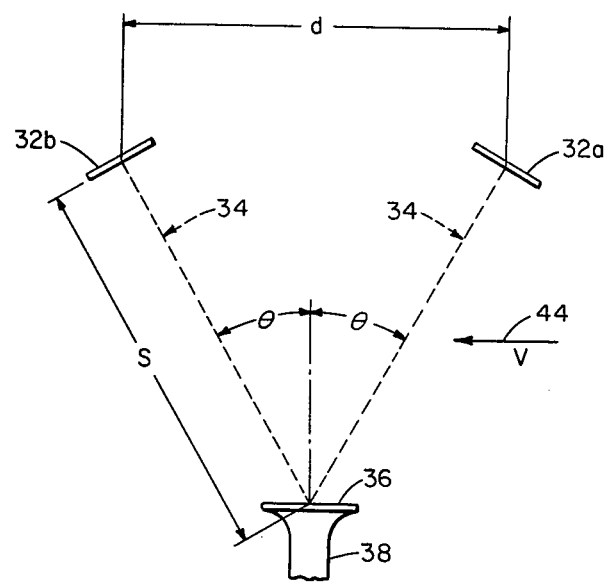
FIG. 2 is a diagram showing the acoustic propagation path useful in describing the operation of the present invention.

Referring to FIG. 2, the following is a brief explanation of the manner in which a current velocity is measured by the acoustic current meter shown in FIG. 1. FIG. 2 is a side view showing two of the four transducers 32 and their relationship to acoustic mirror 36. An electric signal is applied to both of the transducers 32 by means of electronics described in more detail below. In response, each transducer vibrates causing acoustic waves to propagate through the water medium along a path shown by dotted line 34. The acoustic wave travels down from the vibrating transducer 32 and impinges upon acoustic mirror 36. The angle between the propagation path 34 and the normal to the mirror is denoted as $\theta$. The acoustic waves impinging upon acoustic mirror 36 are reflected and propagate upwardly toward the opposite transducer. The angle of reflection is equal to the angle of incidence, $\theta$.

If the water medium is moving and has a horizontal velocity component in the direction of the propagation path 34, denoted by arrow 44 in FIG. 2, the time of propagation between the two transducers 32 is affected. The total propagation velocity of an acoustic wave is equal to the acoustic sound velocity in the medium plus the current velocity component in the direction of propagation. Referring again to FIG. 2, if a current flows from right to left as shown by arrow 44, sound waves emitted by transducer 32a and received after reflection from mirror 36 by transducer 32b travel in the same direction as the current and have a shorter propagation time than sound waves transmitted from transducer 32b to transducer 32a against the current. The difference in propagation times $\Delta T$, is given by the following equation:

$$\Delta T = 2\, vd/c^2 \qquad (1)$$

where v is the current velocity component parallel to a line between the transducers, d is the transducer spacing, and c is the velocity of sound. It should be noted that the time difference $\Delta T$ depends only on the separation, d, of the transducers and is independent of the distance between the mirror 36 and the transducers 32.

In the preferred embodiment described herein, typical dimensions for the transducer configuration shown in FIG. 2 are $d=11$ cm, $\theta=30$ degrees, and $s=11$ cm. For these dimensions and for a sound velocity c of 1500 m/s, the change in propagation time, $\Delta T$ is approximately 1 nanosecond per cm/s of current velocity. Such time differences can be measured by modern high-speed circuitry, and prior art current meters are available which use such circuitry. However, directly measuring such small time differences requires expensive and relatively high-power electronics. Frequently, it is desirable to leave a current meter deployed for long periods of time in remote ocean locations where the current meter must be powered by a self-contained battery pack. Especially in such applications, the high power required by the very high-speed electronics makes such techniques for measuring current velocity impractical.

Figure 3:
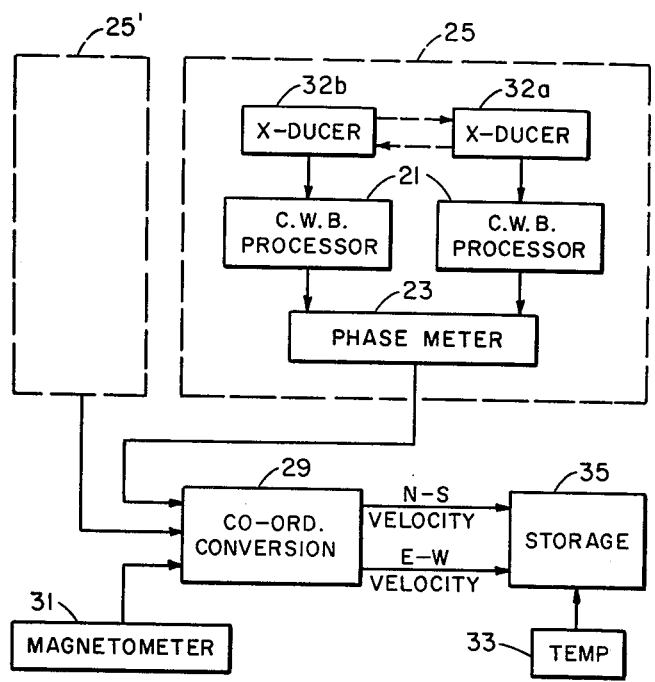
FIG. 3 is a block diagram of the electronic circuitry of the present invention.

Referring to FIG. 3, the electronic section of the present current meter is shown in block diagram form. As described above, two transducers 32a and 32b transmit signals between each other which measure one component of the current velocity. The output signals from transducers 32 are each applied to respective continuous wave burst processors 21. One exemplary embodiment of continuous wave burst processor 21 is shown in detail below in FIGS. 4 and 9. The output from each of the processors 21 is a signal having a much lower frequency than the 1.6 MHz acoustic signals transmitted by transducer 32. These low frequency signals have phase shifts which are representative of the phase of the acoustic signals received by each of transducer 32. Briefly, the continuous wave burst processors heterodyne the output signal from each of the transducers to a much lower frequency, and the result is that the propagation delay produced by the measured current and represented by the phase of the output signals from the transducers is expanded in time. In the present embodiment, the frequency of the output signal from processors 21 is 34 Hz resulting in an increase in the propagation delay of a factor of approximately 50,000. The expanded propagation delay is then easily measured via conventional digital circuitry drawing extremely low power such as CMOS. Since the continuous wave burst processor described below also requires a minimal amount of current, the novel technique disclosed herein results in an acoustic current meter which draws very low power and can therefore be deployed for long periods of time using a battery power supply.

The outputs from processors 21 consist of two 34 Hz signals having a phase shift there between proportional to the current velocity. The outputs from processors 21 are applied to phase meter circuitry 23 which measures the phase difference therebetween to provide an output signal representative of the current velocity. Although phase meter circuitry 23 may be implemented using many different circuits known by those in the art, one particular circuit especially suited for the presently disclosed current meter is described in a co-pending application of Kenneth D. Lawson and Neil L. Brown Ser. No. 947,255 entitled Phase Meter Circuit and filed concurrently with the present application.

The above-described circuitry, shown in FIG. 3 enclosed with dotted box 25, is duplicated for the two orthogonal transducers, and this circuitry is represented by dotted box 25' in FIG. 3. A magnetometer 31 is included as part of the acoustic current meter described herein and provides output signals representative of the orientation of the acoustic current meter with respect to the magnetic field of the earth. The output signal from magnetometer 31 is also applied to digital processor 29. Although many known circuits may be used to implement magnetometer 31, one particular circuit suitable for use with the present invention is disclosed in a co-pending application by Kenneth D. Lawson and Neil L. Brown Ser. No. 947,254 entitled Low Power Magnetometer Circuit and filed concurrently herewith.

A coordinate conversion circuit 29 receives the outputs from circuitry 25 and 25' representative of the orthogonal components of a measured current velocity in a reference frame which is dependent upon the horizontal alignment of the current meter. Conversion circuit 29 also receives signals from magnetom-31 which are representative of the current meter alignment with respect to the earth axes. Using well-known trigonometric transformations, conversion circuit 29 provides output signals representative of the north-south and east-west component of the current velocity. Generally, the acoustic current meter also contains a temperature sensor 33 which measures the temperature of the surrounding water. The velocity of sound in a liquid is a function of the temperature of the liquid, and the data from temperature sensor 33 may be used to provide correction to the measured velocity.

The output data from conversion circuit 29 and temperature sensor 33 is generally recorded on magnetic tape or stored in some other manner, as shown by block 35, so that data over a long period of time may be collected for later analysis. Alternatively, it should be clear that the signals applied to circuitry 29 may be stored directly and later processed.

The continuous wave burst processors 21 measure the above-described time differences in a novel manner which provides a current meter having numerous advantages over prior art devices. In the present invention, both transducers of an opposed pair are simultaneously excited for a predetermined interval of time and emit a burst of continuous wave acoustic energy. Typically, these waves are at a frequency at approximately 1.6 MHz. The two bursts of acoustic waves emitted by transducers 32a and 32b are reflected by acoustic mirror 36 and received by the opposite transducer. If there is a current component flowing along the propagation axis, the different propagation times of the waves emitted by the two transducers moving in opposite directions, as given by equation (1), produces a phase shift between the two acoustic wave bursts. By measuring the phase difference between the waves received by each of the transducers 32a and 32b, the time difference and hence current velocity may be determined.

To measure the phase difference between the two received waves, the output signal from each of the transducers 32 is heterodyned with a reference frequency to produce two difference frequency signals. The heterodyning process results in two difference frequency signals having the same relative phase difference as the higher frequency signals received by the transducers 32 but at a lower frequency. By chosing the reference frequency so that the difference frequency is a very low frequency, the small propagation time difference may be converted into a much longer time difference represented by the phase shift of the two difference frequency signals.

Figure 4:
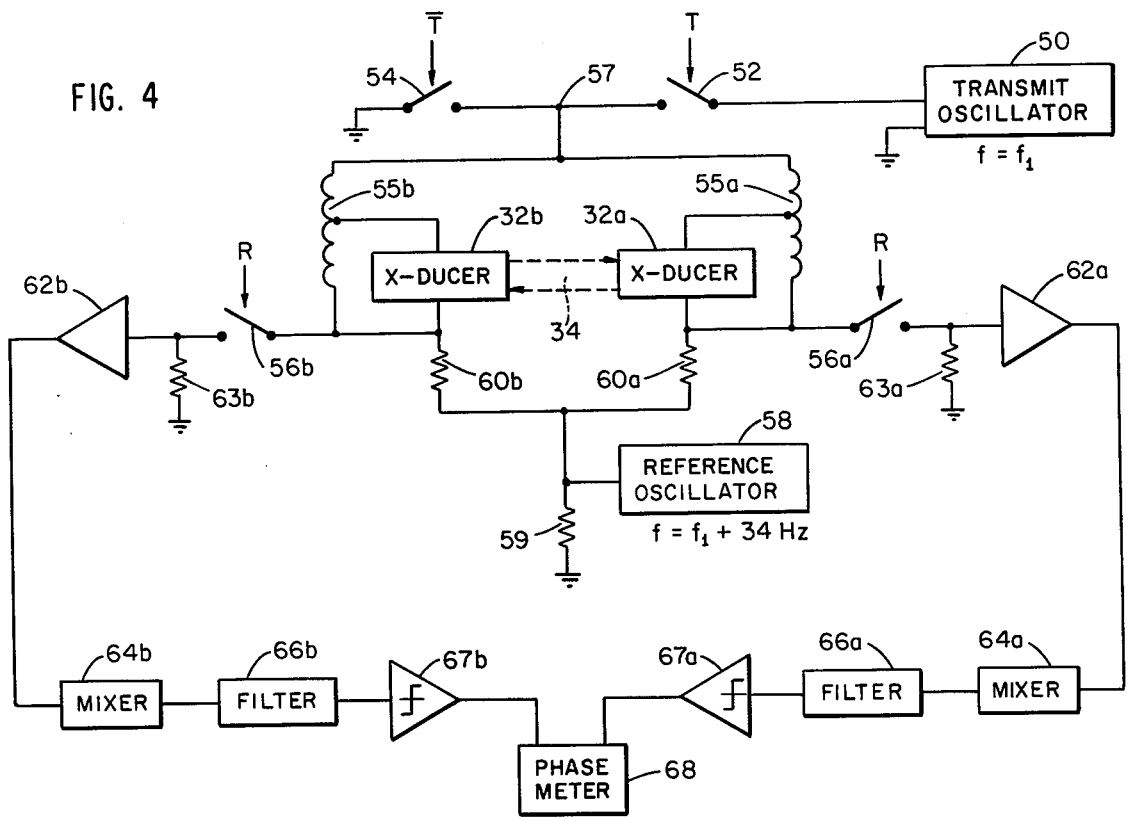
FIG. 4 shows the circuitry associated with the transducers for measuring the propagation time difference.

FIG. 4 is a block diagram of processors 21 which drive transducers 32 with the above-described continuous wave burst signals and which process the received acoustic waves to provide a measurement of current velocity. This circuitry will be described with reference to FIG. 5 which shows waveforms occurring at various points of FIG. 4.

A crystal controlled transmit oscillator 50 is periodically connected to drive transducers 32 via a transmit switch 52. In the preferred embodiment described herein, transmit oscillator 50 has a frequency of 1.605 MHz. The transmit switch is connected between the output of oscillator 50 and two autotransformers 55a and 55b, respectively connected to transducers 32a and 32b. Autotransformers 55 are used to match the high output impedance of the driving circuitry of oscillator 50, which is typically 100 kilohms or more, to the lower impedance of the piezoelectric transducers 32. In the preferred embodiment described herein, transformers 55 have a turns ratio of 4 to 1. In transmit mode, transducers 32 are connected to ground through resistors 60 and the low output impedance of reference oscillator, represented by resistor 59. Since the output signal from reference oscillator 58 is much smaller than the signal from transmit oscillator 50, and since the high impedance of oscillator 50 blocks any flow of current from oscillator 58, its effect on the transmitted signal may be ignored.

Figure 5:
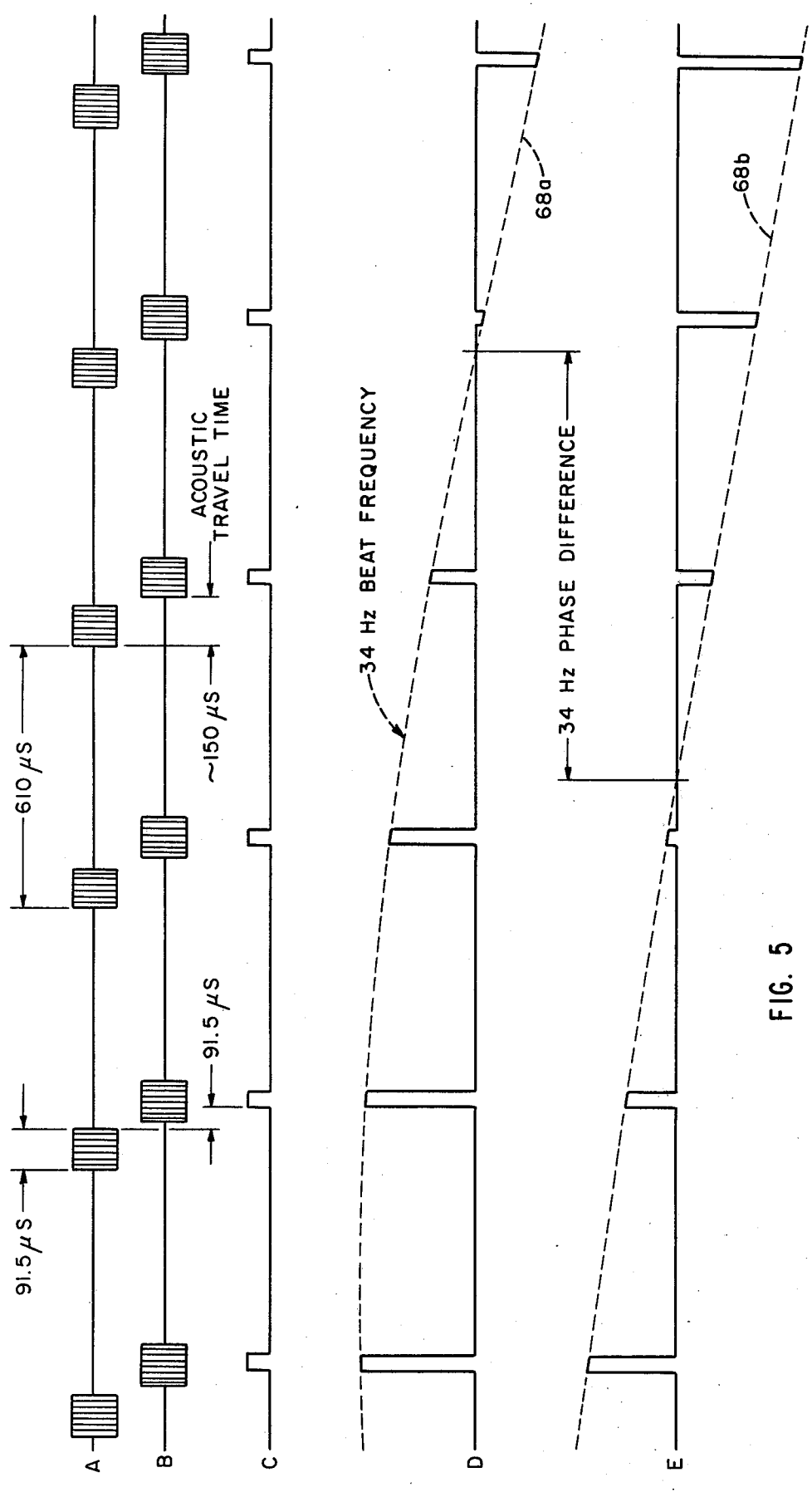
FIG. 5 shows waveforms occurring in the circuitry of FIG. 4 useful in explaining the operation thereof.

Transmit switch 52 is periodically closed in response to a transmit control signal, designated as T in FIG. 4. When transmit switch 52 is closed, the transmit oscillator frequency is applied to opposed transducers 32a and 32b, and in response, these transducers emit a burst of acoustic waves at the transmit oscillator frequency. This is shown in FIG. 5 by waveform A which represents the signals from transmit oscillator 50 applied to transducers 32 by transmit switch 52. In the preferred embodiment described, switch 52 is closed and transducers 32 are excited for approximately 91.5 microseconds repeating every 610 microseconds, as shown in FIG. 5. When switch 52 opens, a second switch 54 closes in response to a $\overline{T}$ signal which is the inverse of the T signal. Switch 54 is connected between autotransformers 55 and ground and provides a return for the signal produced by transducers 32 when they are operating as receiving transducers during receive mode.

The burst of acoustic waves simultaneously transmitted by transducers 32 when transmit switch 52 is closed are each received by the opposite transducer. The propagation time between transducers is determined by the dimensions of the acoustic current meter in question, and in the embodiment described herein, the propagation time is approximately 150 microseconds. Referring to FIG. 5, waveform B illustrates the output signals from transducers 32 in response to the received acoustic waves. As can be seen from FIG. 5, the output signal B is delayed in time from the transmitted signal A by approximately 150 microseconds, Although the output signals from transducer 32a and transducer 32b are illustrated by a single waveform in FIG. 5, if there is a current velocity component flowing along the direction of propagation, the signals from the individual transducers will be shifted slightly in phase with respect to one another, as described above.

The signals from transducers 32a and 32b are processed in an essentially identical manner to provide lower frequency signals whose phase is ultimately compared to measure the current velocity. Accordingly, only the "channel a" circuitry connected to transducer 32a is described below. The operation of the correspondingly numbered "channel b" circuitry is essentially identical.

The output from transducer 32a is applied to a first terminal of a switch 56a. The reference oscillator 58 is connected by a resistor 60 to the first terminal of switch 56a. The signal present at the first terminal of switch 56a is the sum of the output signal from transducer 32a and the output signal of reference oscillator 58. When switch 56a is closed, these summed signals are applied via a buffer amplifier 62a to a non-linear device which generates product terms, such as a demodulator or mixer 64a which produces sum and difference frequency signal components. In the preferred embodiment described, demodulator 64 is a square law detector. The output signal from detector 64a is applied to a filter 66a whose frequency response is chosen to pass the difference frequency component and attenuate the other signal components in the output signal from detector 64a, such as a low-pass or bandpass filter. The output signal from filter 66b is applied to a limiting amplifier 67b.

The output signals produced by transducers 32 in receive mode are much smaller in magnitude then the signals applied to the transducers from transmit oscillator 50 during transmit mode. This is primarily due to the spreading of the acoustic wave which results in only a fraction of the transmitted energy received by each transducer. The signal magnitude from reference oscillator 58 should be approximately the same as the output signal from the transducers 32 to maximize the output signal from detector 64, and thus the signal level from reference oscillator 58 is much smaller than the signal level from transmit oscillator 50, as described above.

The frequency of reference oscillator 58 is chosen to be slightly offset from the frequency of transmit oscillator 50. In the preferred embodiment described herein, the difference between the frequencies of the transmit and the reference oscillators is 34 Hz. Thus, the output from bandpass filter 66a is a signal having a frequency of 34 Hz and having a phase which is determined by the phase of the signal received by transducer 32a and by the phase of reference oscillator 58. In the preferred embodiment, the transmit and reference oscillators are crystal controlled oscillators which are phase locked to ensure a stable 34 Hz difference frequency.

The above-described operation can be more clearly seen by referring to the waveforms in FIG. 5. As described above, the output signals from transducers 32a and 32b are composed of essentially simultaneous bursts of continuous 1.605 MHz signals which are slightly out of phase, the phase difference being determined by the current velocity. Referring to waveform C, the receive gate signal R which operates switches 56 is shown. It can be seen that switches 56 are only closed during a portion of the continuous wave burst received by the transducers. In the preferred embodiment described herein, there is a 91.5 microsecond delay following the end of the transmitted burst to allow any residual oscillations in the transducers to decay to a negligible level. Following this delay, switches 56 are closed for approximately 30.5 microseconds.

The transducer output signal and reference oscillator signal are mixed by detector 64a, and the output from detector 64a, when averaged over the receive gate interval, is a DC signal having a magnitude proportional to the phase difference between the transducer 32a output signal and the reference oscillator signal. Thus, during each receive gate interval, a 30.5 microsecond pulse having an average DC value proportional to this phase difference is produced at the output of detector 64a.

Due to the 34 Hz difference in frequency between the signal received by transducer 32 and the reference oscillator frequency, the phase difference between the signals will slowly vary at a constant 34 Hz frequency. Thus, the output from detector 64a is a series of pulses modulated at a 34 Hz frequency. This is shown by waveform D in FIG. 5. Similarly, the output from the demodulator 64b is a second series of pulses modulated at the 34 Hz beat frequency. This is shown by waveform E in FIG. 5. The phases of the two 34 Hz modulation envelopes are determined by the phase of the reference oscillator and the phases of the signals received by transducers 32. Since the reference oscillator phase is constant for both channels, the phase difference is a function of only the phases of the received signals.

The above-described output signals from detectors 64, shown in waveforms D and E, are applied to bandpass filters 66. Bandpass filters 66 are high-O filters having a center frequency of 34 Hz. The output signals from bandpass filters 66 are 34 Hz sine waves whose relative phase is proportional to the measured current velocity. The output signals from filters 66 are converted to digital signals by limiting amplifiers 67 and are then applied to phase meter circuitry 68 which measures the phase difference to provide an output signal representative of the measured current velocity.

As described above, for the preferred embodiment described herein a one nanosecond time difference corresponds to a current velocity of about 1 cm/s. Typically, the desired accuracy in the measurement of current velocity is on the order of 1 mm/s. Such an accuracy corresponds with a propagation time difference of about $10^{-10}$ seconds. For a transmitter frequency of 1.6 MHz, such a time difference produces a phase shift of about 0.06 degrees. The above-described circuitry results in the same phase difference between the two 34 Hz output signals from bandpass filters 66. Thus, the propagation time difference is effectively increased by the ratio of the 34 Hz difference frequency to the 1.6 MHz carrier frequency. At the 34 Hz difference frequency, a 1 mm/s current producing a 0.06 degrees phase shift results in a time difference of approximately 12 microseconds. Such time differences may be easily measured by readily available and extremely low-power components, such as CMOS logic. It should be clear from the above discussion that the phase shifts introduced by currents of typical velocities are very small. One of the primary concerns in measuring current velocities is the zero offset and offset drift errors of the current meter. Typically, the zero velocity offset should be 1 mm/s or les equivalent current velocity. This corresponds to a phase shift of about 0.06 degrees or less. Thus, the phase shifts through each of the blocks of the circuitry shown in FIG. 3 should be extremely stable. Generally, a constant phase offset can be trimmed out or otherwise compensated for by the processing electronics following the phase measuring circuitry. However, any drift in the zero offset cannot be compensated for. Especially in applications where an acoustic current meter is left unattended for periods up to one year in hostile underwater environments, it is important that the circuitry be properly designed to minimize any drifts in the phase shift characteristics of the various blocks shown in FIG. 3.

There are two primary sources of phase shift which are of concern. First, the interaction of the reactances of transducers 32 with the circuit components to which they are connected may result in differential phase shifts between the two channels caused by changes in circuit component values. Second, the phase shift of bandpass filters 66 must be very flat in the passband centered around 34 Hz to avoid differential phase shifts caused by parameter changes in the filters.

Designing preamplifiers 62 and detectors 64 such that they do not introduce a significant differential phase shift does not pose a great problem in most typical applications. Although the 1.6 MHz signal frequencies applied to preamplifiers 62 are relatively high, these signals are almost identical in frequency, differing by only a factor of about $5 \times 10^{-4}$. Even though parameter changes in the preamplifier may significantly change the phase shift of a 1.6 MHz signal amplified by the preamplifier, the difference in phase shifts between reference oscillator signal and the acoustically received is practical negligible. In practice, the circuitry of preamplifiers 62 is identical, and these amplifiers are located in close proximity. A dirft of a circuit parameter causing a phase shift in one amplifier produces a similar if not identical phase shift in the second preamplifier, and these corresponding phase shifts will reduce any differential phase shift between the received and reference oscillator signals even further.

Typically, demodulators 64 are square law detectors implemented by means of a semiconductor junction having a nonlinear response, or by some other nonlinear detector. Changes in the phase shift through such devices are generally small to begin with, and the same reasoning given above with respect to preamplifiers 62 results in phase shifts through detectors 64 which are also negligible.

Figure 6A:
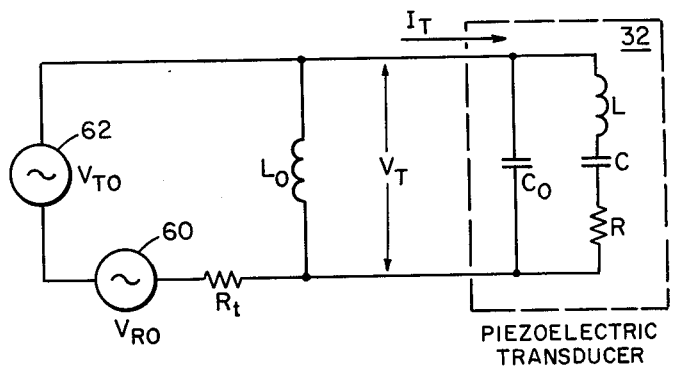
FIG. 6a and 6b are equivalent circuit diagrams of the transducer circuits useful in explaining one aspect of the present invention.
Figure 6B:
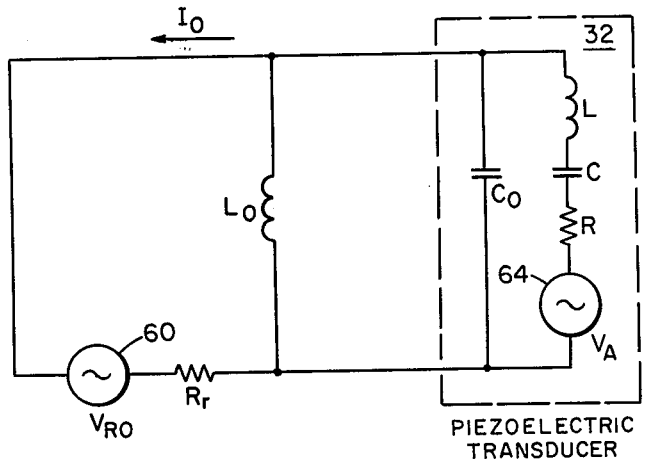

Addressing the question of differential phase shift through transducers 32, reference is made to FIGS. 6a and 6b which show the equivalent circuits of transducers 32 during transmit and receive modes respectively. It has been discovered that by matching the impedances seen by the transducers during transmit and receive modes, the differential phase shift between the signals going from transducer 32a to transducer 32b and the signals going in the opposite direction from transducer 32b to transducer 32a can be minimized. This is true for transducers of all types, as well as the piezoelectric transducers used in the preferred embodiment. Referring back to FIG. 4, reference oscillator 58 is essentially a voltage service having very low or zero impedance; and the impedance between ground and node 57, which is common to both channels, seen by each of transducers 32 during transmit mode is equal to the value of resistors 60 increased by a factor equal to the square of the turns ratio of transformers 55. During receive mode, switches 56b are closed, and the impedance seen by each transducer 32 is essentially equal to the parallel combination of resistor 60 and the input impedance of preamplifier 62, represented by resistor 63. By matching the impedances seen by the transducers during transmit mode and during receive mode, differential phase shifts in the two channels caused by changes in other circuit parameter are significantly reduced.

To simplify the explanation, a unity turns ratio is assumed for impedance matching transformer 55. In FIGS. 6a and 6b, L, R, and C represent the equivalent electrical circuit of a piezoelectric transducer, the losses caused by acoustic energy radiated or absorbed by the transducer being included in R. $C_o$ is the static capacitance of the transducer. $L_o$ is the inductance of matching transformer 55. Voltage generator 60 represents the reference oscillator and voltage generator 62 represents the transmit oscillator. The electric signal produced by an acoustic wave impinging upon the transducer 32 during receive mode, $V_A$ is represented by voltage generator 64.

During transmit mode, the acoustic signal emitted by the transducer is in phase with the current flowing into the transducer. This current is denoted by $I_T$ in FIG. 5a. The phase relationship between the excitation signal, the transmit oscillator output signal, denoted as $V_{TO}$ in FIG. 6a, and the acoustic wave generated by the transducer may be broken down into two phase shifts. The first is the phase shift between the transmit oscillator and the voltage across the transducer, denoted by $V_T$ in FIG. 6a. This phase shift is denoted as $\theta_1$ and is given by:

$$\theta_1 = \tan^{-1}\left[\frac{(R^2 + Z^2)(Y)R_t + Z \cdot R_t}{(R^2 + Z^2) + R \cdot R_t}\right] \quad (2)$$

where $Z = (\omega L - \frac{1}{\omega C})$ \quad (3a)

$Y = (\frac{1}{\omega L_o} - C_o)$ \quad (3b)

The second part of the phase shift is the phase relationship between the voltage across the transducers, $V_T$ and the current into the transducer, $I_T$. This phase shift is denoted as $\theta_2$ and is given by:

$$\theta_2 = \tan^{-1}(Z/R) \quad (4)$$

Thus, the total phase shift between the transmit oscillator output signal and the acoustic wave emitted by the transducer is $\theta_T$ where $$\theta_T = \theta_1 + \theta_2 \quad (5)$$

Referring to FIG. 6b, the phase angle during receive mode, $\theta_R$, between the transducer output current $I_O$ and the acoustically induced voltage $V_A$ is given by:

$$\theta_R = \tan^{-1}\left[\frac{R \cdot R_r \cdot Y - Z}{R + R_r + R_r ZY}\right] \quad (6)$$

where $R_r$ is the impedance seen by the transducer during receive mode.

The total differential phase shift between transmit mode and receive mode is denoted as $\Delta\theta$ and is given by:

$$\Delta\theta = \theta_R - \theta_T = \theta_R - (\theta_1 + \theta_2) \quad (7)$$

or, rearranging terms:

$$\Delta\theta = (\theta_R - \theta_2) - \theta_1 \tag{8}$$

Taking the first term of the right-hand side of equation (8) and using the trigonometric identity for the tangent of the difference of two angles, this term may be represented as:

$$\tan(\theta_R - \theta_2) = \left[ \frac{\tan\theta_R - \tan\theta_2}{1 + \tan\theta_R \tan\theta_2} \right] \tag{9}$$

$$(\theta_R - \theta_2) = \tan^{-1}\left[ \frac{\tan\theta_R - \tan\theta_2}{1 + \tan\theta_R \tan\theta_2} \right] \tag{10}$$

Inserting the values for $\theta_R$ and $\theta_2$ from equations (4) and (6) into equation (10) gives:

$$\theta_R - \theta_2 = \tan^{-1}\left[ \frac{\frac{R \cdot R_R \cdot Y - Z}{R + R_R + R_R \cdot Z \cdot Y} - \left(\frac{-Z}{R}\right)}{1 + \frac{R \cdot R_R \cdot Y - Z}{R + R_R + R_R \cdot Z \cdot Y}\left(\frac{-Z}{R}\right)} \right] \tag{11}$$

or $$\theta_R - \theta_2 = \tan^{-1}\left[ \frac{(R^2 + Z^2)(Y) R_r + Z \cdot R_r}{(R^2 + Z^2) + R \cdot R_r} \right] \tag{12}$$

It can be seen that the value given by equation (12) is identical to the value of $\theta_1$ given by (2) with the receiving impedance $R_r$ being substituted for the transmitting impedance $R_t$. From equation (8) the total differential phase shift $\Delta\theta$ is equal to the difference between $\theta_1$ and the value given in equation 12. Thus, if $R_r$ is equal to $R_t$, the total differential phase shift is zero irrespective of changes in the other parameters of equations (2) and (12).

In other words, if the generator impedance in the transmit mode is the same as the load impedance in the receive mode, the differential phase shift will always be zero, irrespective of any changes in the other parameters in FIGS. 6a and 6b. For example, if $C_o$ changes due to temperature or pressure, the differential phase shift will remain zero. This is shown in Table 1 below which contains computed values for the differential phase shift for various values of transducer parameters. As described above, in the preferred embodiment described herein the relationship between the current and the acoustic phase shift is approximately equal to 0.5 degree per cm/sec. From Table 1 it can be seen that for large variations in transducer parameters, the velocity error for matched receiving and transmitting impedances is zero. Where it is impractical to maintain $R_t$ and $R_r$ equal, these resistive value shoud be kept as low as possible. From Table 1 it can be seen that for an $R_r$ of 22.4 ohms and an $R_g$ of 68 ohms, the maximum differential phase error correspond to velocity errors of less than 0.3 cm/sec.

The impedance of a piezoelectric transducer is equal to $(Z^2 + R^2)^{\frac{1}{2}}$. The nominal values of the transducer R, L, and C parameters, given in the first three lines of Table 1, result in a transducer impedance at 1.6 MHz which is resistive and equal to 165 ohms. The impedance difference between $R_t$ and $R_r$ in the described embodiment, shown in FIG. 9 and represented by lines 13-24 of Table 1, is 43.6 ohms or about 26 percent of the 165 ohm nominal transducer impedance at the 1.6 MHz frequency of the acoustic signals transmitted and received by the transducers.

Referring back to FIGS. 4 and 5, the following requirements must be met by bandpass filter 66a. As shown in FIG. 5 due to the gating of the transducer output by switch 56, the output from detector 64a consist of periodic pulses having a frequency of approximately 1,600 Hz. Due to the extremely small phase angles which must be measured very accurately, the 1,600 Hz component in the output of detector 64 must be very highly attenuated. Further, to provide a very accurate phase measurement of the 34 Hz component in the signal from detector 64, bandpass filter 64 must have a very stable phase shift through the passband around 34 Hz. One filter which is capable of meeting the

TABLE I

| $C_o$ | $L_o$ | R | L | C | $R_r$ | $R_t$ | 17 Phase Diff. |
|---|---|---|---|---|---|---|---|
| 350 | 22.92 | 165 | 251.0 | 39.3 | 68.0 | 68.0 | 0.00 |
| 400 | 22.92 | 165 | 251.0 | 39.3 | 68.0 | 68.0 | 0.00 |
| 450 | 22.92 | 165 | 251.0 | 39.3 | 68.0 | 68.0 | 0.00 |
| 350 | 22.92 | 165 | 240.0 | 39.3 | 68.0 | 68.0 | 0.00 |
| 400 | 22.92 | 165 | 240.0 | 39.3 | 68.0 | 68.0 | 0.00 |
| 450 | 22.92 | 165 | 240.0 | 39.3 | 68.0 | 68.0 | 0.00 |
| 350 | 22.92 | 165 | 251.0 | 41.0 | 68.0 | 68.0 | 0.00 |
| 400 | 22.92 | 165 | 251.0 | 41.0 | 68.0 | 68.0 | 0.00 |
| 450 | 22.92 | 165 | 251.0 | 41.0 | 68.0 | 68.0 | 0.00 |
| 350 | 25.00 | 165 | 251.0 | 39.3 | 68.0 | 68.0 | 0.00 |
| 400 | 25.00 | 165 | 251.0 | 39.3 | 68.0 | 68.0 | 0.00 |
| 450 | 25.00 | 165 | 251.0 | 39.3 | 68.0 | 68.0 | 0.00 |
| 350 | 22.92 | 165 | 251.0 | 39.3 | 22.4 | 68.0 | .08 |
| 400 | 22.92 | 165 | 251.0 | 39.3 | 22.4 | 68.0 | 0.00 |
| 450 | 22.92 | 165 | 251.0 | 39.3 | 22.4 | 68.0 | −.08 |
| 350 | 22.92 | 165 | 240.0 | 39.3 | 22.4 | 68.0 | .14 |
| 400 | 22.92 | 165 | 240.0 | 39.3 | 22.4 | 68.0 | .12 |
| 450 | 22.92 | 165 | 240.0 | 39.3 | 22.4 | 68.0 | .10 |
| 350 | 22.92 | 165 | 251.0 | 41.0 | 22.4 | 68.0 | −.06 |
| 400 | 22.92 | 165 | 251.0 | 41.0 | 22.4 | 68.0 | −.08 |
| 450 | 22.92 | 165 | 251.0 | 41.0 | 22.4 | 68.0 | −.09 |
| 350 | 25.00 | 165 | 251.0 | 39.3 | 22.4 | 68.0 | .02 |
| 400 | 25.00 | 165 | 251.0 | 39.3 | 22.4 | 68.0 | −.05 |
| 450 | 25.00 | 165 | 251.0 | 39.3 | 22.4 | 68.0 | −.13 |
| 350 | 22.92 | 165 | 251.0 | 39.3 | 22.4 | 1000.0 | 3.65 |
| 400 | 22.92 | 165 | 251.0 | 39.3 | 22.4 | 1000.0 | −.01 |
| 450 | 22.92 | 165 | 251.0 | 39.3 | 22.4 | 1000.0 | −3.71 |
| 350 | 22.92 | 165 | 240.0 | 39.3 | 22.4 | 1000.0 | 9.30 |
| 400 | 22.92 | 165 | 240.0 | 39.3 | 22.4 | 1000.0 | 7.82 |
| 450 | 22.92 | 165 | 240.0 | 39.3 | 22.4 | 1000.0 | 6.39 |
| 350 | 22.92 | 165 | 251.0 | 41.0 | 22.4 | 1000.0 | −4.18 |
| 400 | 22.92 | 165 | 251.0 | 41.0 | 22.4 | 1000.0 | −5.30 |
| 450 | 22.92 | 165 | 251.0 | 41.0 | 22.4 | 1000.0 | −6.46 |
| 350 | 25.00 | 165 | 251.0 | 39.3 | 22.4 | 1000.0 | 1.05 |
| 400 | 25.00 | 165 | 251.0 | 39.3 | 22.4 | 1000.0 | −2.64 |
| 450 | 25.00 | 165 | 251.0 | 39.3 | 22.4 | 1000.0 | −6.36 | above requirements is described in a co-pending application Ser. No. 947,256 entitled Bandpass Filter Having Low Pass-Band Shift by Neil L. Brown and Kenneth D. Lawson, filed concurrently herewith.

Referring to FIG. 7, the arrangement of transducers 32 and acoustic mirror 36 is shown in more detail. One pair of opposed transducers 32a and 32b are positioned as described and shown above in FIG. 2 such that acoustic waves from each transducer travel downwardly along acoustic path 34, are reflected by acoustic mirror 36, and impinge upon the opposite transducer. A second pair of transducers 32c and 32d is located as shown in FIG. 7 so that the acoustic path 34 between these transducers is at right angles to the acoustic path 34 between transducers 32a and 32b. Thus, the two pairs of transducers 32 measure horizontal velocity components along orthogonal axes to provide a complete representative of the measured current.

One of the primary advantages of acoustic current meters such as the present invention is that there is very little disturbance of the current flow by the current meter in the area where the current velocity measurement is made. The V-shaped acoustic paths between the transducers 32 and the acoustic mirror 36 ensure that neither the transducers nor the mirror produce any significant wake in the acoustic beam. The four support rods 14 which position the lower support section 12 and acoustic mirror 36 are located along orthogonal axes at a 45 degree angle to the plane of acoustic propagation paths 34. These rods are small in diameter and produce a minimum wake, and any wake produced by the rods will intersect only a small segment of the acoustic propagation paths 34. Thus, the orientation shown in FIG. 7 results in minimum error caused by interference of the measurement equipment with the normal current flow.

Although shown as a single dotted line in FIGS. 2 and 7, the acoustic waves propagate in a beam which diverges as it propagates through the water medium. Due to this divergence, only a fraction of the acoustic energy by a transducer is ultimately received by the opposite transducer, and part of the acoustic beam may overlap the sides of acoustic mirror 36. Prior art acoustic meter mirrors have been circular discs or spherical. It has been discovered that fabricating acoustic mirror 36 in a square configuration with the propagation paths 34 between transducers 32 aligned with the diagonals of the square provides advantages over previous mirrors. The reasons for this alignment can be seen more clearly by referring to FIGS. 8a, b, and c.

In FIG. 8a, a transducer 32 is shown emitting a beam of radiation denoted by dotted lines 34 which is reflected by a prior art circular acoustic mirror 46. As shown in FIG. 8a, this beam of radiation diverges and only part of the acoustic energy emitted by the transmitting transducer 32 is reflected by the acoustic mirror 46.

A portion of the acoustic energy which does not impinge upon the top surface of mirror 46 is reflected by the sides and edge of the acoustic mirror, as shown by waves 47 in FIG. 8a. It has been discovered that a significant fraction of the acoustic energy 47 reflected by the top peripheral edge of disc-shaped mirrors is directed back at transducer 32. These spurious reflections are shown by arrow 48 in FIG. 8a. Referring to FIG. 8b which is a top view of the arrangement of FIG. 8a, these reflections 48 are shown more clearly. It can be seen from FIG. 8b that with prior art circular mirrors, spurious reflections from along an an appreciable portion of the circumference of mirror 46 are reflected in a direction so as to impinge upon the transmitting transducer 32.

Although only a small fraction of the total energy received by transducer 32 is composed of the spurious reflections 48, due to the very small phase angles being measured, these reflections may result in significant errors in the measurement of current velocity. For example, with a frequency of 1.6 MHz, if the spurious reflections 48 are 90 degrees out of phase with the acoustic signal received from the opposite transducer, and if 0.1% of the energy received by the transducer consists of the spurious reflections, a phase error of approximately 0.3 degrees is introduced. This corresponds with a current velocity of approximately 1 cm/s.

By chosing a square configuration for the acoustic mirror any by aligning the diagonals with the transducer axes, the spurious reflections 48 may be dramatically reduced. This can be seen by referring to FIG. 8c which is a top view of transducers 32 and the novel, square acoustic mirror 36 used in the present invention.

Most of the acoustic energy impinging upon the top periphial edge of acoustic mirror 36 is reflected away from the transmitting transducer at an angle of approximately 45 degrees, as shown by waves 49 in FIG. 8c. Only a very small amount of acoustic energy is reflected back toward the transducer 32 by the corner of the square acoustic mirror 36, as shown by waves 51 in FIG. 8c, and thus, any phase errors introduced by these spurious reflections are reduced. It should be appreciated that configurations for acoustic mirror 36 other than shown may be used to reduce the spurious reflections which are reflected back to the transmitting transducer, although the above-described square mirror 36 having diagonals aligned along the propagation path has been found to be superior in performance to other configurations.

Another source of spurious reflections from the acoustic mirror may occur if a portion of the energy impinging upon the acoustic mirror is not reflected from the top surface of the mirror, but rather propagates through the mirror and reflects off the bottom surface of the mirror. Multiple reflections between the top and bottom surface may also occur. In order to minimize this error source, the maximum amount of acoustic energy possible should be reflected from acoustic mirror 36.

The ratio between the pressure of the reflected wave and the pressure of the incident wave is given by:

$$R = \frac{Z_0 \cdot \cos\theta - Z_1}{Z_0 \cdot \cos\theta + Z_1} \quad (13)$$

where R is the ratio and $Z_0$ and $Z_1$ are the acoustic impedances of the mirror and water respectively. The acoustic impedance of a material is equal to the density of that material multiplied by the velocity of sound in the material. From equation (13) it can be seen that to maximize the acoustic power in the reflected wave and minimize power entering mirror 36, the acoustic impedance of the solid medium, $Z_0$, should be as high as possible. Of the commonly available materials which are suitable for fabricating acoustic mirror 36, tungsten has the highest product of density and sound velocity. Typically, mirror 36 is formed from annealed tungsten, and is approximately 0.1 inches thick.

Referring to FIG. 9, there is shown one exemplary circuit for driving transducers 32 during transmit mode and for receiving, preamplifying, and detecting the received signal during receive mode. Only one channel of the circuitry shown in FIG. 4 is illustrated in FIG. 9, but it should be clear that the other channel would include identical circuitry and would be connected as shown in FIGS. 4 and 9.

As shown in FIG. 4 and described above, transmit oscillator 50 is connected to autotransformer 55 via transistor switch 52 which connects the oscillator to the autotransformer in response to a transmit signal denoted as T. The return terminal from transmit oscillator 50 is connected to ground through capacitor 70. One terminal of capacitor 70 is grounded, the second terminal providing an A.C. ground. The second terminal of capacitor 70 is connected to autotransformer 55 and transducer 32 via a 2.7 ohm resistor 59 and a series-connected 68 ohm resistor 60. Transducer 32 is connected across the secondary outputs of autotransformer 55. Autotransformer 55 typically has a turns ratio of 4 to 1. At the end of the transmit period, switch 52 disconnects transmit oscillator 50 from autotransformer 55 and transducer 32. A second transmit gating signal $\overline{T}$ is applied to a FET switch 72 causing it to be in a conductive stage during non-transmit periods. Switch 72 serves to ground one side of autotransformer 55 during receive mode and also serves to shunt any stray signals from transmit oscillator 50 which may be capacitively-coupled or leak through transistor switch 52.

Reference oscillator 58 has one terminal connected between the junction of resistors 59 and 60 and a second terminal connected to the A.C. ground point provided by capacitor 70. The reference oscillator signal is applied to preamplifier 62 through resistor 60, as described above in connection with FIG. 4.

The output from transducer 32 is applied to a grounded-base transistor amplifier stage 74 via a coupling capacitor 76. The emitter of transistor 74 is connected to a negative voltage via resistor 78 to provide quiescent current. The value of resistor 78 is typically much larger than the input impedance of grounded-base amplifier 74. In the present example, the input impedance of transistor 74 is approximately 30 ohms. During receive mode, this impedance is in parallel with resistor 60 to provide an equivalent impedance seen by transducer 32 of approximately 22 ohms. The primary winding 80 of a transformer 82 is connected in series with a capacitor 84 to provide the load impedance for grounded-base amplifier 74.

The output from amplifier stage 74 is taken from the secondary winding 86 of transformer 82. The receive gating switch 56 is provided by a FET switch 88 in series with the outputs from secondary winding 86 and a second FET switch 90 connected across FET switch 88 and secondary winding 86. When the receive gating switch is closed, FET switch 90 is non-conductive and FET switch 88 is conductive to apply the output signal from secondary winding 86 to the base terminal of a transistor 92. To disconnect transistor 92 from secondary winding 86, FET switch 88 is turned off by the receive gating signal R, and $\overline{R}$ signal, the inverse of the receive gating signal R, is applied to FET switch 90, and when FET switch 88 is open, FET switch 90 is closed to shunt any signal present at the output of FET switch 88 due to leakage or capacitive coupling. A resistor 94 is connected across secondary winding 86 and provides a path for the output signal from winding 86 when FET switch 88 is open.

Transistor 92 provides both amplification and serves as a square law detector. The base current to transistor 92 is maintained at a level such that transistor 92 operates along the knee of the base-emitter junction transfer characteristic. Although the transfer function of a diode is exponential in form, the signals applied to transistor 92 are very small; and over a limited range, the exponential transfer function of the base-emitter junction provides a close approximation to a square law characteristic.

The base current to transitor 92 is controlled by a second transistor 94, which is connected to transistor 92 in a current-mirror configuration. The base and collector terminals of transistor 94 are connected, and the collector current of transistor 94 is determined by a resistor 96 between the collector and ground. The emitters of both transistor 92 and transistor 94 are connected to a positive voltage source, and the base-collector terminal of transistor 94 is connected to the base terminal of transistor 92 via a resistor 96 which shunts switching transients from FET switches 88 and 90.

Preferably, transistors 92 and 94 are matched transistors. Since either FET switch 88 or 90 is always on, there is a D.C. connection between the bases of transistors 94 and 92. Thus, the base to emitter voltages of both transistor 92 and 94 are essentially identical, and the quiescent current of transistor 92 is equal to the collector current of transistor 94. A capacitor 96 is connected between the emitter and collector of transistor 94 to stablize the quiescent voltage applied to transistor 92.

During receive mode when the receive gating switch 56 is closed, the output from secondary winding 86 is applied across resistor 96 to transistor 92. As described above, the base-emitter junction of transistor 92 operates as a square law detector. A load impedance made up of resistor 100 and capacitor 102 connected in parallel is connected between the collector of transistor 92 and a negative voltage. When receive gate switch 56 is closed, the signal from secondary winding 86 is both detected and amplified by transistor 92. The output signal from the collector of transistor 92 is applied to an emitter-follower buffer stage made up of a transistor 104 and an emitter resistor 106. The output from the emitter of transistor 104 is applied to the following circuitry, as shown in FIG. 4.

There has been described a novel acoustic current meter which provides advantages over devices previously known for measuring ocean currents and the like. It should be appreciated that the system disclosed is useful for measuring liquid velocities other than ocean currents, and the disclosure of a preferred embodiment for measuring ocean currents should not be taken to limit the present invention to such measurements. It should be further appreciated that the features and advantages of the present invention may still be achieved with modifications and additions to the circuitry disclosed above. Accordingly, the invention is not to be limited by the apparatus disclosed but is only to be interpreted in accordance with the appended claims.

What is claimed is:

1. A system for measuring a component of the velocity of a flow of liquid and for providing an output signal representative of the velocity component, comprising:

at least two transducers positioned so that acoustic energy emitted by each of the transducers travels along an acoustic path therebetween and impinges upon the other transducer, each transducer including terminals for applying a signal thereto to cause the transducer to emit acoustic signals and for providing a transducer output signal representative of an acoustic signal received by the transducer;

a transmit oscillator for providing an output signal of a first frequency;

means for periodically applying the transmit oscillator output signal to each of the transducers to cause the transducers to emit a burst of acoustic energy;

a reference oscillator for producing an output signal at a second frequency different from the first frequency by a difference frequency;

first and second signal processing channels respectively associated with the first and second transducers for processing output signals produced by the associated transducer in response to acoustic signals received thereby, each signal processing channel including:

a summing point to which is applied the output signal from the associated transducer;

means for applying the reference oscillator output signal to the summing point to produce a composite signal at the summing point representative of the sum of the reference oscillator output signal and the output signal from the associated transducer; and means, responsive to the composite signal, for producing an intermediate signal at the difference frequency having a phase which is representative of the phase of the acoustic signal received by the associated transducer; and means for comparing the phases of the intermediate signals from the first and second processing channels and for producing a signal representative of the phase difference therebetween to provide a representation of the velocity component being measured.

2. The system of claim 1 wherein the summing point is located in the signal processing channel so as to be prior to signal processing stages which would tend to introduce a phase shift in the reference oscillator and transducer output signals, so that any phase shift introduced by subsequent signal processing stages will tend to affect both the transducer and reference oscillator output signals, thereby reducing any differential phase shift therebetween.

3. The System of claim 1 or 2 wherein each of the signal processing channels includes:

a non-linear detector, to which is applied the composite signal, for producing an output signal including difference frequency components.

4. The system of claim 3 wherein each of the signal processing channels includes means for selecting the difference frequency signals from the output of the detector and for rejecting other signals produced by the detector.

5. The system of claim 3 wherein each channel includes a filter, having a pass-band including the difference frequency, to which is applied the detector output signal.

6. The system of claim 5 wherein each of the signal processing channels includes a gating means for selecting a portion of the output signal from the associated transducer, for processing, the portion being taken from the output signal subsequent to the beginning thereof so as to reduce the effects of any residual oscillations resulting from prior emission of acoustic signals by the associated transducer.

7. The system of claim 5 further including:

third and fourth transducers disposed so that acoustic signals emitted by each of the third and fourth transducers travels along an acoustic path therebetween and impinges upon the other of the third and fourth transducers, and positioned so that the acoustic path between the third and fourth transducers is orthogonal to the acoustic path between the first and second transducers;

the means for periodically applying being further operative to periodically apply the transmit oscillator output signal to the third and fourth transducers;

third and fourth signal processing channels respectively associated with the third and fourth transducers for processing output signals from the associated transducer, the third and fourth signal processing channels including the same aforementioned elements included in said first and second signal processing channels.

8. The system of claim 2 wherein the impedance presented to each transducer during periods when it is emitting acoustic signals is substantially equal to the impedance presented to that transducer during periods when it is receiving acoustic signals.

9. The system of claim 8 wherein each of the transducers are piezoelectric transducers.

10. The system of claim 1 including means for phase locking the frequencies of the transmit and reference oscillators to provide a stable difference frequency there between.

11. The system of claim 1 wherein the frequency of the transmit oscillator is approximately 1.6 MHz.

12. The system of claim 9 wherein the difference frequency is approximately 34 Hz.

13. The systems of claim 1 including an acoustic mirror wherein the transducers and acoustic mirror are positioned so that acoustic signals emitted by each of the transducers are reflected by the acoustic mirror in a V-shaped acoustic path so as to impinge upon the receiving transducer.

14. The system of claim 8 or 13 wherein the acoustic mirror is substantially square in shape and is positioned so that a diagonal of the square is parallel to the plane of the V-shaped acoustic path between the first and second transducers.

15. The system of claim 14 wherein the acoustic mirror is formed of a flat, thin tungsten plate.

16. An acoustic current meter for measuring a component of a velocity of a flow of liquid, comprising:

two transducers positioned so that acoustic energy emitted by each of the transducers travels along an acoustic path therebetween and impinges upon the other transducer, each transducer including terminals for applying a signal thereto to cause the transducer to emit acoustic signals and for providing a transducer output signal representative of an acoustic signal received by the transducer;

means for periodically applying an A.C. signal of a first frequency to both transducers concurrently to cause the transducers to periodically emit bursts acoustic energy of the predetermined frequency; and means, responsive to output signals produced by each transducer in response to acoustic energy emitted by the other transducer, for comparing the phase of the transducer output signals and for providing an output signal representative of the phase difference therebetween, including:

means for heterodyning each transducer output signal with a signal of a second frequency to provide two difference frequency signals; and means for comparing the phases of the difference frequency signals, and wherein the impedance presented to each transducer during periods when it is emitting acoustic signals is substantially equal to the impedance presented to that transducer during periods when it is receiving acoustic signals.

17. The acoustic current meter of claim 16 wherein the means for comparing includes gating means for selecting only a portion of the transducer output signals from each burst for comparing, the portion being taken from the transducer output signal subsequent to the beginning of each burst of acoustic energy received thereby so as to reduce the effects of any residual oscillations resulting from prior emission of acoustic signals by the associated transducer.

18. The acoustic current meter of claim 16 or 17 wherein each of the transducers are piezoelectric transducers.

19. The acoustic current meter of claim 18 wherein the first frequency is approximately 1.6 MHz.

20. In an acoustic current meter for measuring the velocity of a flow of liquid of the type having a first transducer, a second transducer, an acoustic mirror, the first and second transducers and acoustic mirror being positioned so that acoustic signals emitted by each of the transducers are reflected by a top surface of the acoustic mirror so as to impinge upon the other transducer in a V-shaped acoustic path, the improvement comprising:

an acoustic mirror constructed so as to eliminate peripheral edges of the top surface which are aligned with respect to the path of the acoustic signals emitted by the transducers so as to reflect a portion of the acoustic signals impinging thereon back toward the transducer from which the signals were emitted.

21. The acoustic current meter of claim 20 wherein the top surface of the acoustic mirror has at least two corners pointing in different directions, each corner being formed by the intersection of two sides, the mirror being positioned so that each of the two corners is pointing in the general direction of a respective one of the two transducers so as to reduce reflections from the sides which impinge upon the transducers.

22. The acoustic current meter of claim 20 wherein the acoustic mirror is substantially square in shape.

23. The acoustic current meter of claim 22 wherein the mirror is positioned so that a diagonal of the square is aligned with the plane in which the acoustic path between the two transducers lies.

24. The acoustic current meter of claims 20, 21, 22 or 23 wherein the acoustic mirror is formed of a flat, thin tungsten plate.

25. The acoustic current meter of claim 20 wherein the acoustic current meter includes third and fourth transducers positioned so that the signals emitted from each of the third and fourth transducers are reflected by the acoustic mirror so as to impinge upon the other transducer in a V-shaped acoustic path, the third and fourth transducers being positioned so that the plane of the acoustic path therebetween is perpendicular to the plane of the acoustic path between the first and second transducers; and wherein the acoustic mirror top surface is substantially square in shape and is positioned so that the diagonals of the square are parallel with the planes of the acoustic path between the first and second transducers and between the third and fourth transducers.

26. The acoustic current meter of claim 25 wherein the mirror is formed of a thin, flat plate of tungsten.

27. The acoustic current meter of claim 26 wherein the plate is formed of an annealed tungsten, approximately 0.01 inches thick.

28. The acoustic current meter of claim 20 wherein the acoustic mirror top surface is polygonal in shape and positioned so that a line running from one apex of the polygon to another apex of the polygon is substantially parallel to the plane of the acoustic path.

29. The acoustic current meter of claim 20 wherein the acoustic mirror top surface is in the shape of a regular polygon having an even number of sides and is positioned so that a line from one apex of the polygon to another apex of the polygon bisecting the polygon is substantially parallel to the plane of the acoustic path.

30. In an acoustic current meter for measuring a component of the velocity of a flow of liquid of the type having at least two transducers positioned so that acoustic signals emitted by each transducer impinge on the other transducer, means for periodically applying a signal to each of the transducers to cause the transducers to emit acoustic signals, and means, connected to the transducers and responsive to output signals produced in response to acoustic signals received by the transducers, for detecting the relative phase of the transducer output signals and for producing a signal representative of a component of the liquid velocity, the improvement wherein the means for applying includes means for presenting a first impedance to each transducer during periods when the transducer is emitting acoustic signals, wherein the means for detecting includes means for presenting a second impedance to each transducer during periods when the transducer is receiving acoustic signals, and wherein the first and second impedances are substantially equal.

31. The acoustic current meter of claims 16 or 30 wherein the transducers are piezoelectric transducers.

32. A system for measuring a component of the velocity of a flow of liquid and for providing an output signal representative of the component of the velocity, comprising:

at least two transducers positioned so that acoustic energy emitted by each of the transducers travels along an acoustic path therebetween and impinges upon the other transducer, each transducer including terminals for applying a signal thereto to cause the transducer output signal representative of an acoustic signal received by the transducer;

a transmit oscillator for providing an output signal of a first frequency;

means for periodically applying the transmit oscillator output signal to each of the transducers to cause the transducers to emit a burst of acoustic energy;

a reference oscillator for producing an output signal at a second frequency different from the first frequency by a difference frequency;

first and second signal processing channels respectively associated with the first and second transducers for processing output signals produced by the associated transducer in response to acoustic signals received thereby, each signal processing channel including;

means, responsive to the output signal from the associated transducer and to the reference oscillator output signal, for producing an intermediate signal at the difference frequency having a phase which is representative of the phase of the acoustic signal received by the associated transducer; and means for comparing the phases of the intermediate signals from the first and second processing channels and for producing a signal representative of the phase difference therebetween to provide a representation of the velocity component of the liquid flow being measured; and wherein the impedance present to each transducer during periods when it is emitting acoustic signals is substantially equal to the impedance presented to that transducer during periods when it is receiving acoustic signals.

33. The system of claim 32 wherein each of the transducers are piezoelectric transducers.

34. A system for measuring a component of the velocity of a flow of liquid and for providing an output signal representative of the velocity component, comprising:
   at least two transducers positioned so that acoustic energy emitted by each of the transducers travels along an acoustic path therebetween and impinges upon the other transducer, each transducer including terminals for applying a signal thereto to cause the transducer to emit acoustic signals and for providing a transducer output signal representative of an acoustic signal received by the transducer;
   a transmit oscillator for providing an output signal of a first frequency;
   means for periodically applying the transmit oscillator output signal to each of the transducers during successive transmit intervals to cause each of the transducers to emit bursts of acoustic energy, the burst occurring at a repetition frequency;
   a reference oscillator for producing an output signal at a second frequency different from the first frequency by a difference frequency, the difference frequency being such that one cycle of the difference frequency extends over a plurality of transmit intervals;
   first and second signal processing channels respectively associated with the first and second transducers for processing output signals produced by the associated transducer in response to acoustic signals received thereby, each signal processing channel including:
      means, responsive to the output signal from the associated transducer and to the reference oscillator output signal, for producing an intermediate signal at the difference frequency having a phase which is representative of the phase of the acoustic signal received by the associated transducer; and
   means for comparing the phases of the intermediate signals from the first and second processing channels and for producing a signal representative of the phase difference therebetween to provide a representation of the velocity component of the liquid flow being measured.

35. The system of claim 34 wherein the means for producing includes a band pass filter having a center frequency equal to the difference frequency.

36. The system of claim 34 wherein the means for producing includes;
   combining means responsive to the transducer output signal and the reference oscillator signal to produce an output signal which includes a series of pulses occurring at the repetition frequency, the amplitude of the pulses being modulated at the difference frequency with a phase representative of the phase of the acoustic signal received by the acoustic transducer; and
   a band pass filter having a center frequency equal to the difference frequency to which is applied the series of pulses from the combining means for producing an output signal at the difference frequency having a phase which is representative of the acoustic signal received by the associated transducer.

37. The system of claim 36 further including gating means for selecting a portion of each signal received by the associated transducer and for applying the selected portion to the combining means.

38. The system of claim 37 wherein the combining means includes a non-linear detector to which is applied the reference oscillator output signal and the associated transducer output signal for producing an output signal including difference frequency components.

39. The system of claims 34, 36, or 38 wherein the ratio between the first frequency and the difference frequency is at least approximately 50,000.

* * * * *

UNITED STATES PATENT AND TRADEMARK OFFICE
CERTIFICATE OF CORRECTION

PATENT NO. : 4,221,128
DATED : September 9, 1980
INVENTOR(S) : Kenneth D. Lawson and Neil L. Brown It is certified that error appears in the above-identified patent and that said Letters Patent are hereby corrected as shown below:

First page (title page), under "Inventors", change "Cataumdet" to ---Cataumet---.

In the Abstract, line 8, change "simultaneous" to ---simultaneously---.

Col. 1, line 62, change "simultaneous" to ---simultaneously---.

Col. 6, last line, change the comma (,) to a period (.).

Col. 8, line 33, change "high-0" to ---high-Q---.
     line 66, change "les" to ---less---.

Col. 9, line 31, insert ---signals--- after "received";
     line 32, change "practical" to ---practically---;
     line 34, change "dirft" to ---drift---;
     line 61, change "service" to ---source---.

Col. 11, line 53, change "shoud" to ---should---.

Col. 12, TABLE 1, Under the Column headed "$R_t$", "1000.0" should be ---10000.0---.

Col. 13, line 20, insert ---emitted--- after "energy".
     line 47, delete "an" (2nd occurrence)
     line 64, change "any" to ---and---.

Col. 14, line 2, change "periphial" to ---peripheral---.

UNITED STATES PATENT AND TRADEMARK OFFICE
CERTIFICATE OF CORRECTION

PATENT NO. : 4,221,128
DATED : September 9, 1980
INVENTOR(S) : Kenneth D. Lawson and Neil L. Brown It is certified that error appears in the above-identified patent and that said Letters Patent are hereby corrected as shown below:

Col. 16, line 5, change "transistor" to ---transistors---.

Col. 22, claim 36, line 4, insert ---output--- after "oscillator".

Signed and Sealed this

Twenty-sixth Day of May 1981

[SEAL]

Attest:

RENE D. TEGTMEYER

Attesting Officer

Acting Commissioner of Patents and Trademarks